(12) United States Patent
Buer et al.

(10) Patent No.: US 8,086,844 B2
(45) Date of Patent: Dec. 27, 2011

(54) ONLINE TRUSTED PLATFORM MODULE

(75) Inventors: Mark Buer, Gilbert, AZ (US); Pradeep Dubey, Cupertino, CA (US)

(73) Assignee: Broadcom Corporation, Irvine, CA (US)

(*) Notice: Subject to any disclaimer, the term of this patent is extended or adjusted under 35 U.S.C. 154(b) by 951 days.

(21) Appl. No.: 10/452,792

(22) Filed: Jun. 3, 2003

(65) Prior Publication Data

US 2004/0250126 A1 Dec. 9, 2004

(51) Int. Cl.
*H04L 29/06* (2006.01)
*H04L 9/00* (2006.01)

(52) U.S. Cl. ........ 713/151; 713/150; 713/153; 713/189; 726/12; 709/223; 709/224; 709/225

(58) Field of Classification Search ............ 726/27, 726/12, 2–3, 26; 713/189, 193, 194, 150–151, 713/153; 380/255; 709/223–225; 370/235.1
See application file for complete search history.

(56) References Cited

U.S. PATENT DOCUMENTS

| | | | | |
|---|---|---|---|---|
| 6,070,198 A * | 5/2000 | Krause et al. | ................. | 719/321 |
| 6,697,948 B1 * | 2/2004 | Rabin et al. | ..................... | 726/30 |
| 6,853,988 B1 * | 2/2005 | Dickinson et al. | ............. | 705/75 |
| 6,925,562 B2 * | 8/2005 | Gulcu et al. | ................... | 713/172 |
| 6,976,054 B1 * | 12/2005 | Lavian et al. | ................. | 709/203 |
| 6,986,059 B2 * | 1/2006 | England et al. | ................ | 705/51 |
| 7,069,442 B2 * | 6/2006 | Sutton et al. | .................. | 713/179 |
| 7,107,463 B2 * | 9/2006 | England et al. | ............... | 713/193 |
| 7,174,465 B2 * | 2/2007 | Freeman et al. | ............... | 713/191 |
| 7,200,758 B2 * | 4/2007 | Zimmer | ........................ | 713/192 |
| 7,215,781 B2 * | 5/2007 | Grawrock | ..................... | 380/283 |
| 7,228,291 B2 * | 6/2007 | Seamons et al. | ................ | 705/37 |
| 2002/0147927 A1 * | 10/2002 | Tait | ................. | 713/201 |
| 2002/0159391 A1 * | 10/2002 | Demizu | .................... | 370/235.1 |
| 2002/0174233 A1 * | 11/2002 | Murakami | .................... | 709/227 |
| 2003/0009657 A1 * | 1/2003 | French et al. | ..................... | 713/2 |
| 2003/0041250 A1 * | 2/2003 | Proudler | ........................ | 713/182 |
| 2003/0051133 A1 * | 3/2003 | Pearson | ........................ | 713/155 |
| 2003/0105957 A1 * | 6/2003 | Brabson et al. | ............... | 713/164 |
| 2003/0123441 A1 * | 7/2003 | Singh et al. | .................... | 370/392 |
| 2004/0243723 A1 * | 12/2004 | Davis et al. | ..................... | 709/250 |
| 2004/0249957 A1 * | 12/2004 | Ekis et al. | ..................... | 709/228 |

* cited by examiner

*Primary Examiner* — Yin-Chen Shaw
(74) *Attorney, Agent, or Firm* — Sterne, Kessler, Goldstein & Fox P.L.L.C.

(57) ABSTRACT

An online trusted platform module (TPM) in communication with a security module that can be located elsewhere in the network in a server machine. In an embodiment, the online TPM is connected directly to a network interface card (NIC) that is also resident at the client. This allows the online TPM to communicate directly to the network, and therefore to the security module (without having to deal with the TCP/IP stack at the client machine in some circumstances, e.g., the boot process). In an embodiment, the communications channel between the online TPM and the security module is implemented using the transport layer security (TLS) protocol. A secure boot process is performed in advance of security processing. Typical security processing includes receipt, by the online TPM, of one or more commands from an application. The online TPM then proxies out the commands to the security module. After the security module has completed its processing of the commands, results of the processing and any related status information is returned to the online TPM.

21 Claims, 7 Drawing Sheets

ONLINE TRUSTED PLATFORM MODULE

CROSS-REFERENCE TO RELATED APPLICATIONS

Not applicable.

STATEMENT REGARDING FEDERALLY-SPONSORED RESEARCH AND DEVELOPMENT

Not applicable.

REFERENCE TO MICROFICHE APPENDIX/SEQUENCE LISTING/TABLE/COMPUTER PROGRAM LISTING APPENDIX

Not applicable.

BACKGROUND OF THE INVENTION

1. Field of the Invention

The invention described herein relates to information security and to security in networked information systems in particular.

2. Background Art

In a networked information system, information security functions are often allocated on a per machine basis. Each machine in the network is traditionally responsible for the security of information that the machine sends, receives, stores, or otherwise processes. Relevant security functions include, but are not limited to, encryption, decryption, authentication, key management, and integrity assurance.

While there are obvious advantages to having such functionality at each machine, there are also disadvantages. First, replication of all such functionality at each machine is expensive. Second, the amount of logic required to execute these functions can be considerable. In a software embodiment, this translates to large amounts of code, and a large amount of memory. Speed can also be an issue in a software implementation, given the amount of logic that must be executed.

In a hardware embodiment, extensive functionality translates to a significant space requirement, since considerable silicon may be needed. This, in turn, can lead to additional design concerns, such as those related to power consumption and heat dissipation. Finally, if long term key storage is required (e.g., in an architecture that complies with the Trusted Computing Platform Alliance (TCPA) Main Specification) then non-volatile memory (NVM) is also required at each client.

What is needed, therefore, is a security architecture that makes all of the necessary security functionality available at machines in a network in a cost effective manner. Preferably, this is accomplished in a manner that requires minimal silicon and/or memory, and avoids the need for NVM.

BRIEF SUMMARY OF THE INVENTION

The invention described herein comprises an online trusted platform module (TPM) at client machines in a computer network. The TPM is online in the sense that it is in communication with a security module that can be located elsewhere in the network. In an embodiment of the invention, the online TPM is connected directly to a network interface card (NIC) that is also resident at the client. This allows the online TPM to communicate directly to the network and the security module. This circumvents the TCP/IP stack at the client machine, e.g., during the boot process. In an embodiment of the invention, the communications channel between the online TPM and the security module is implemented using the transport layer security (TLS) protocol.

The method of the present invention includes a secure boot process in advance of subsequent security processing. Typical security processing includes the receipt, by the online TPM, of one or more commands from an application. The online TPM then proxies out the commands to the security module. As the security module completes execution of a command, the results and any related status information are returned to the online TPM.

BRIEF DESCRIPTION OF THE DRAWINGS/FIGURES

The present invention will be described with reference to the accompanying drawings. In the drawings, like reference numbers generally indicate identical, functionally similar, and/or structurally similar elements. The drawing in which an element first appears is indicated by the left most digit in the reference number.

DETAILED DESCRIPTION OF THE INVENTION

A preferred embodiment of the present invention is now described. While specific configurations and arrangements are discussed, it should be understood that this is done for illustrative purposes only. A person skilled in the relevant art will recognize that other configurations and arrangements can be used without departing from the spirit and scope of the invention. It would be apparent to a person skilled in the relevant art that this invention can also be employed in a variety of other systems, networks, and applications.

I. OVERVIEW

The invention described herein comprises an online TPM located at machines in a computer network. The TPM is in communication with a security module which can be located elsewhere in the network. In an embodiment of the invention, the online TPM is connected directly to a co-located NIC. This allows the online TPM to communicate directly to the network and the security module. This circumvents the TCP/IP stack at the client machine, e.g., during the boot process. In an embodiment of the invention, the communications channel between the online TPM and the security module is implemented using the TLS protocol.

The method of the invention includes a secure boot process in advance of subsequent security processing. Typical security processing includes the receipt, by the online TPM, of one or more commands from an application. The online TPM then proxies out the commands to the security module. As the security module completes execution of a command, the results and any related status information are returned to the online TPM.

II. SYSTEM

Figure 1:
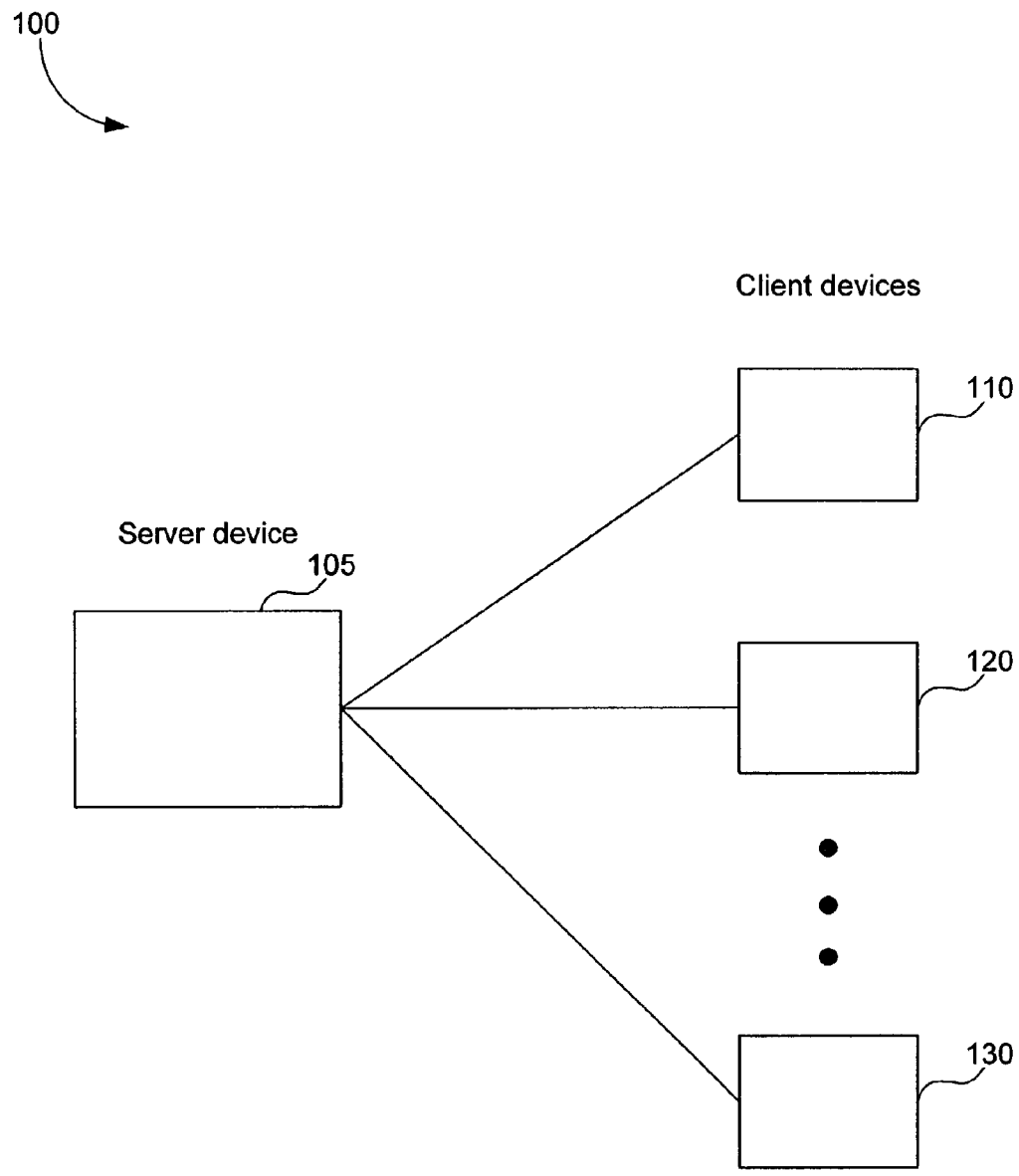
FIG. 1 is a block diagram illustrating a typical topology of a client-server computer network.

The system context of the invention is illustrated in FIG. 1. A server or server-like device 105 is shown in communication with a set of clients or client-like devices, 110-130. Typically, device 105 provides services and data to each of devices 110-130. In an embodiment of the invention, server 105 includes a security module. One or more of the clients each include an online TPM. In an alternative embodiment, the clients are all connected to a security module, which is in turn connected to a separate server.

Figure 2:
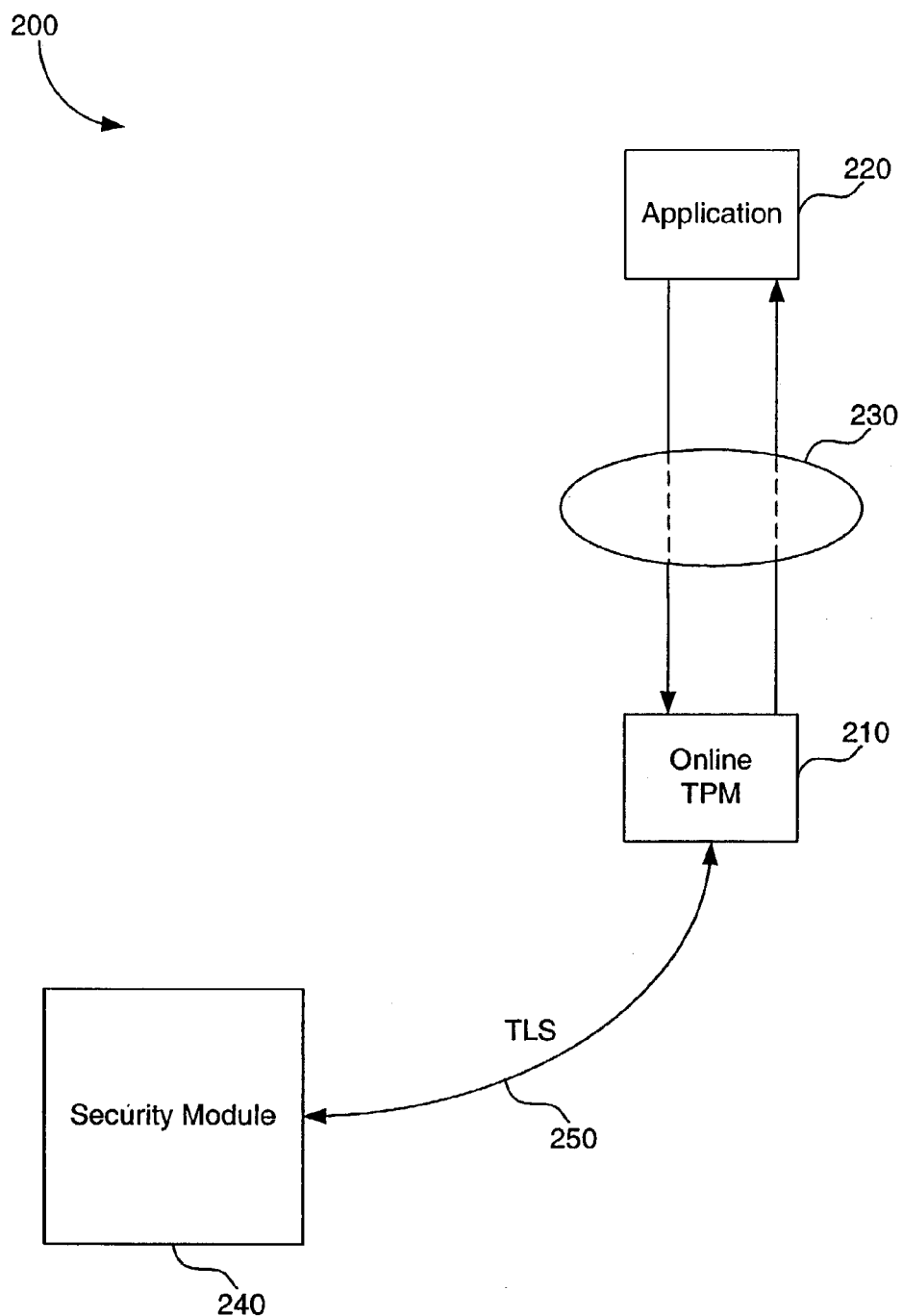
FIG. 2 is a block diagram illustrating the connectivity between an online TPM, an application, and a security module, according to an embodiment of the invention.

FIG. 2 illustrates the connectivity between an online TPM and a security module. Online TPM 210 receives commands from an application 220. In an embodiment of the invention, a command from application 220 is first processed through a software stack 230 before reaching online TPM 210. Software stack 230 may or may not be trusted. The command is then proxied by the online TPM 210 to security module 240, located elsewhere in the network. In an embodiment of the invention, online TPM 210, application 220, and software stack 230 can be included in a client, such as client 110 of FIG. 1. Moreover, in an embodiment of the invention, security module 240 can be implemented in hardware, and can be located in a trusted environment. Security module 240 can be located in a secure host, for example.

Connection 250 implements the channel between online TPM 210 and security module 240. In an embodiment of the invention, connection 250 uses the TLS protocol. Implementation of this protocol provides authentication between security module 240 and online TPM 210. Version 1.0 of this protocol is described more fully at http://www.i-etf.org/rfc/rfc2246.txt, and is incorporated herein by reference in its entirety. A secure authentication and handshake process for establishment of a TLS connection is described more fully in U.S. Pat. No. 7,289,632, entitled "System and Method for Distributed Security," which is incorporated by reference in its entirety. For instance, a security module (e.g., security module 240) is preprogrammed to contain server authorization data associated with a particular key server (e.g., located at server device 105) and the server's public key. The server authorization data can be, for example, data used in a secure hashing algorithm (e.g., SHA1 process). A local host (e.g., client device 110) can transfer an authorized server public key to the security module (e.g., security module 240). The security module (e.g., security module 240) can then calculate a secure hash value based on the authorized server public key. If the resulting value matches the pre-stored server authorization data, then the authorization of the associated key server is verified. If the key server is a key server associated with the public key, then the key server is trusted by a client (e.g., client device 110) and a secure connection between the client (e.g., client device 110) and key server can be created. Once a key server is recognized as authorized and a secure handshake has taken place, a secure session is formed in which keys or other information can be transferred between the key server and the client (e.g., client device 110). The authorization of a key server and its public key allows a number of other operations to take place securely, such as the transfer of configuration messages. A configuration message can be used to configure the logic of the security module (e.g., security module 240). It may be desirable, for example, to reconfigure the security module (e.g., security module 240) so as to impose some minimum or maximum key length. Given the above mechanism, such a reconfiguration can be implemented using the configuration message. This represents a secure method by which a reconfiguration can be implemented while the system is in the field. Such a configuration process would be useful in situations where it is desirable to build and field a security module (e.g., security module 240) but configure it differently depending on whether the security module is to be exported.

Security module 240 provides security functionality, such as key management and storage of some or all cryptographic state information on behalf of online TPM 210. After the command is processed by security module 240, result and status information is returned to online TPM 210 via connection 250. This information may then be forwarded from online TPM 210 to application 220. In an embodiment of the invention, security module 240 can be included in a server, such as server 105 of FIG. 1.

Moreover, security module 240 can be embodied in hardware, software, or some combination thereof. In the event of an embodiment that includes software, security module 240 can be upgraded by upgrading its software. Note that this can be done independently of online TPM 210, i.e., without necessarily having to upgrade or otherwise modify online TPM 210.

Note that multiple online TPMs embodied in multiple respective client machines can connect to a given security module. In such an arrangement, the security module provides security functionality to each connected online TPM in the manner just described.

Figure 3:
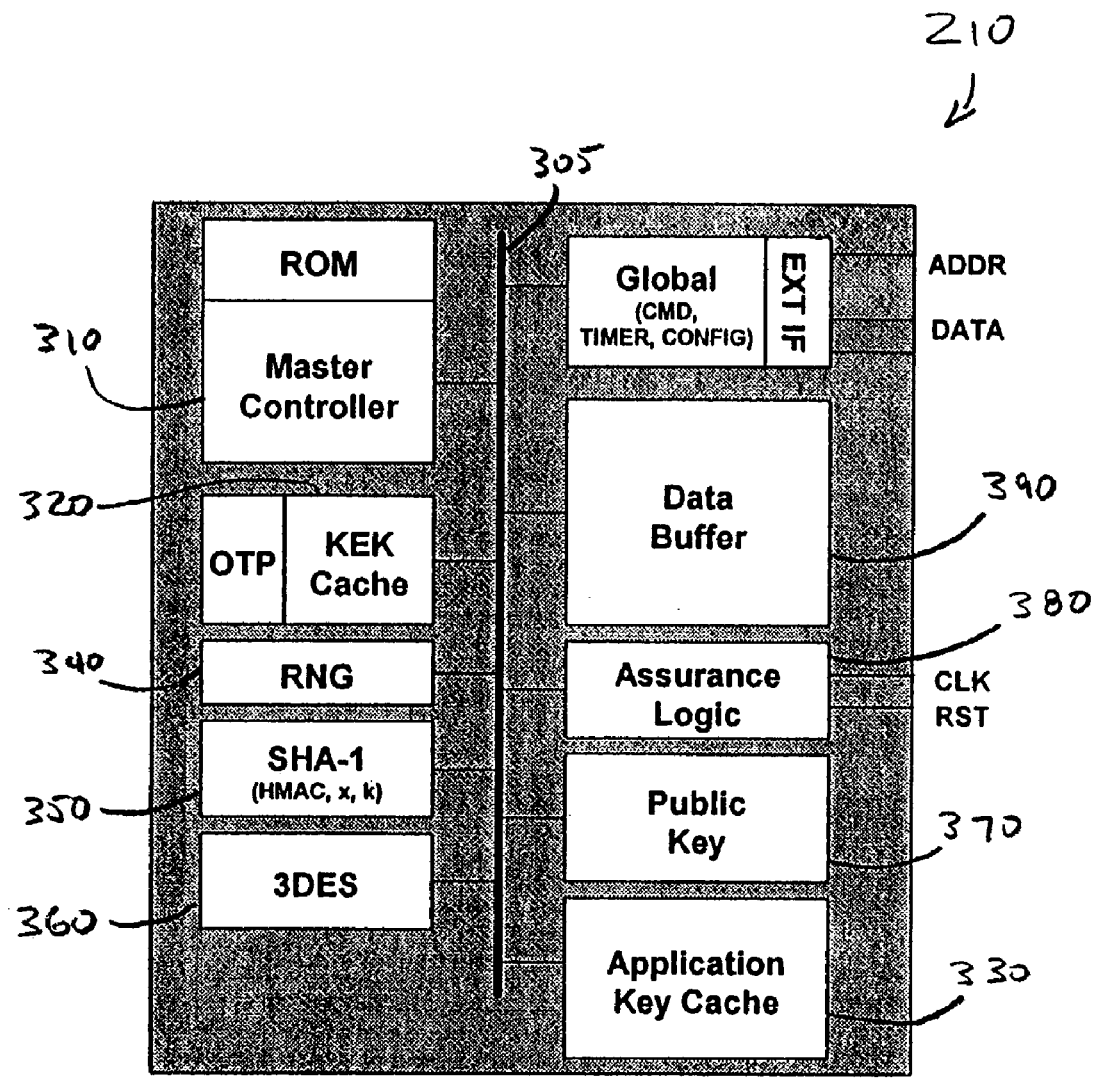
FIG. 3 is a block diagram illustrating an embodiment of an online TPM.

An embodiment of online TPM 210 is illustrated in FIG. 3. The illustrated embodiment includes a master controller 310 connected to a bus 305. This embodiment also includes logic and storage for the maintenance of cryptographic keys. A cache for key encrypting keys (KEK) is provided by cache 320. An application key cache is also included in the form of cache 330. This embodiment also includes a random number generator (RNG) 340. Authentication logic is provided by a module 350 that implements the Secure Hash Algorithm (SHA-1) algorithm. Stream encryption is also provided. In the illustrated embodiment, this is implemented with a triple Data Encryption Standard (3DES) module 360. Storage and logic for public key operations is provided in module 370. Logic for ensuring the integrity of security operations is provided by module 380. The implementation shown also includes a data buffer 390. All of the above components are connected via bus 305. Note that because of the functionality provided by the security module, online TPM can be implemented without NVM.

Figure 4:
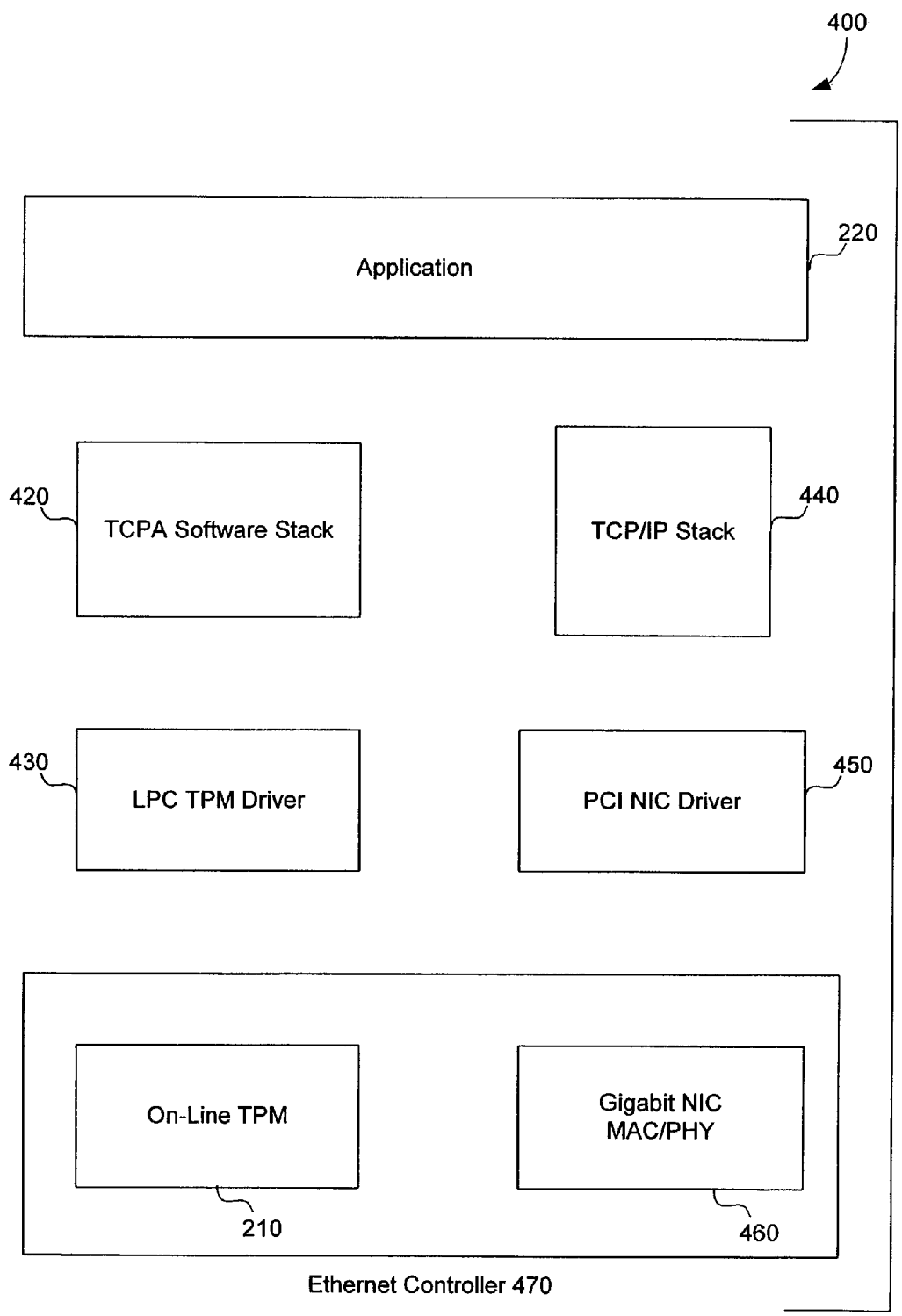
FIG. 4 is a block diagram illustrating logical components of an online TPM according to an embodiment of the invention.

Online TPM 210 is shown in the context of a client machine in FIG. 4. Between online TPM 210 and application 220 is TCPA software stack 420, and TPM driver 430. As described above, software between online TPM 210 and application 220, e.g., TCPA software stack 420, may or may not be trusted. Commands from application 220 are processed through software stack 420 and driver 430 before reaching online TPM 210. In addition, network communications require logic to implement a network communications protocol. In the illustrated embodiment, the protocol logic is implemented by TCP/IP stack 440. Network connectivity is provided by NIC 460. To support NIC 460, a peripheral component interconnect (PCI) NIC driver 450 is provided.

Note that in the embodiment shown, online TPM 210 and NIC 460 are collocated in an ethernet controller 470.

Figure 5:
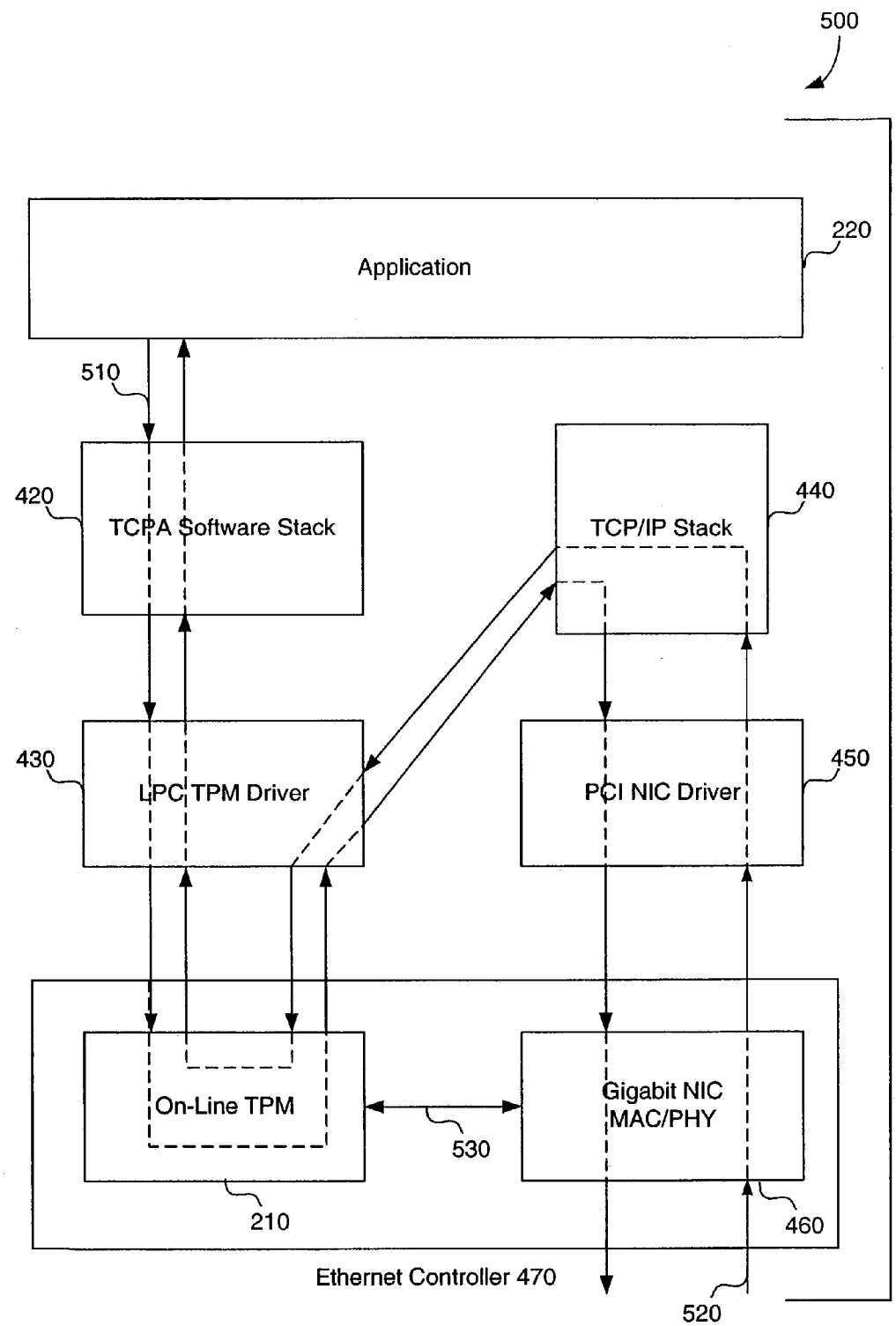
FIG. 5 illustrates the flow of information between processing modules at a client machine, according to an embodiment of the invention.

The data flow for this embodiment is illustrated in FIG. 5. A command 510 passes through TCPA software stack 420 and TPM driver 430 before reaching online TPM 210. Online TPM 210 then proxies out the command to a hardware security module. To accomplish this, the command is routed from online TPM 210 through TPM driver 430 to TCP/IP software stack 440. The command is then sent, via NIC driver 450 to NIC 460. The command is then sent via the computer network to a security module (not shown). Result and status information 520 is returned from the security module through NIC 460, NIC driver 450, and TCP/IP stack 440. Information 520 is then passed to online TPM 210 via TPM driver 430. Information 520 is then passed back to application 220 via TPM driver 430 and TCP/IP software stack 420.

Note that in the embodiment shown, online TPM 210 and NIC 460 can communicate through a connection 530. This allows a more immediate and secure connection between online TPM 210 and the security module during the boot process. TCP/IP stack 440 and NIC driver 450 can be effectively circumvented during that process. During, the secure boot process, the security module can therefore be directly accessed to obtain information regarding the necessary state of the online TPM 210. Hence, online TPM 210 can be connected to the security module, even when the platform is otherwise shut down. The boot process will be described in greater detail below.

III. METHOD

Figure 6:
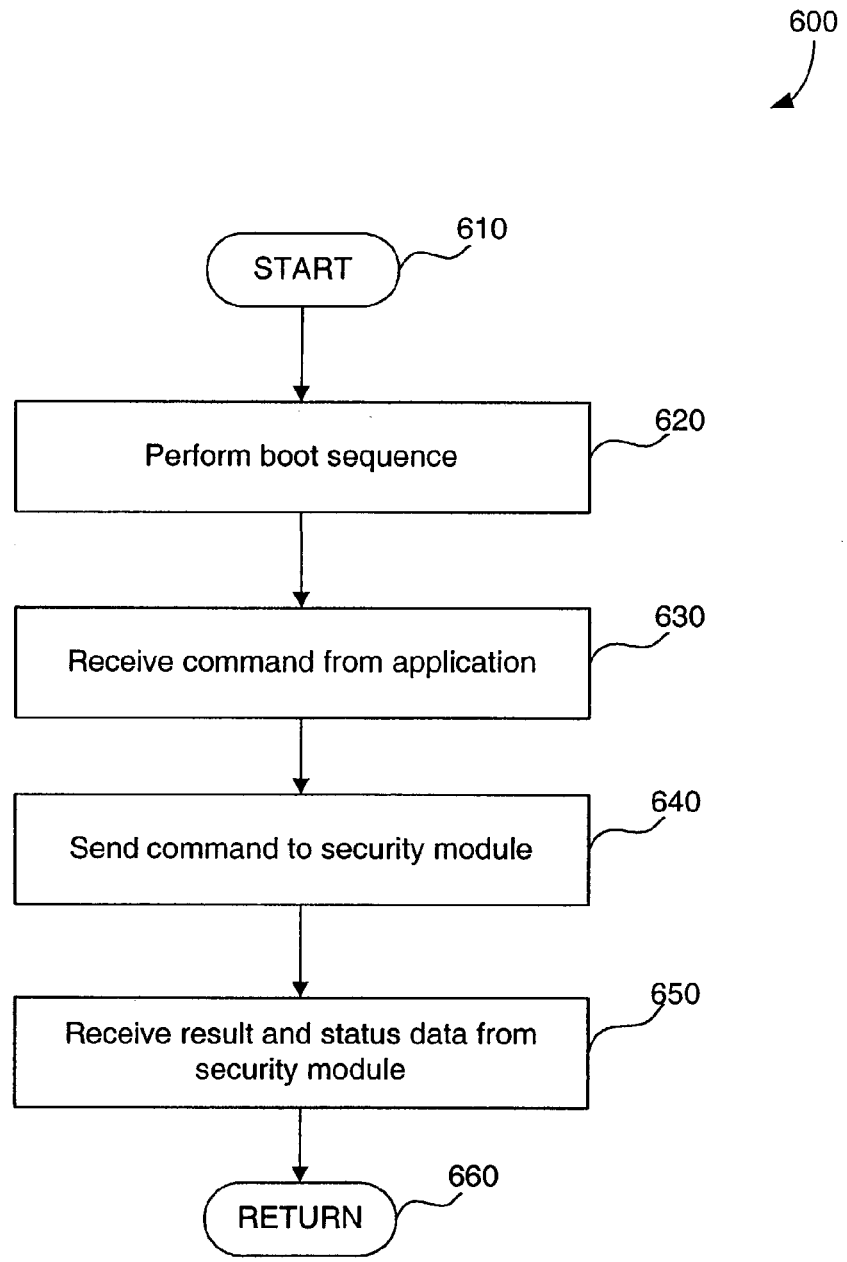
FIG. 6 is a flowchart illustrating an embodiment of the method of the invention.

Information processing at an online TPM is illustrated in FIG. 6. The process begins at step 610. In step 620, the boot sequence is performed. In step 630, a command is received from the application. In step 640, the command is sent by the online TPM to a security module. In step 650, after the security module has completed processing of the command, the online TPM receives result and status information from the security module. The process concludes at step 660.

Figure 7:
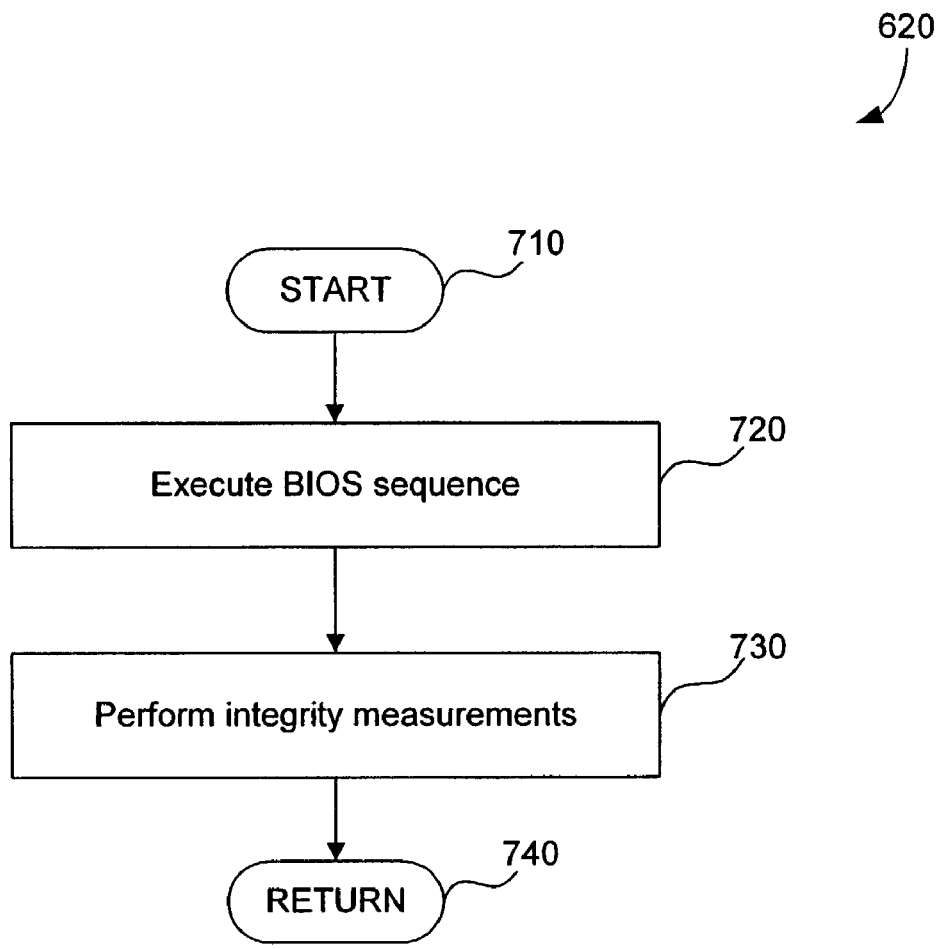
FIG. 7 is a flow chart illustrating the boot sequence, according to an embodiment of the invention.

The boot sequence is illustrated in greater detail in FIG. 7. This process begins at step 710. In step 720, a sequence of code associated with the basic input output system (BIOS) is executed. During the execution of the BIOS code, cryptographic state information is retrieved from the security module according to an embodiment of the present invention. In an embodiment, the retrieval of the cryptographic state information is performed via a direct connection between the online TPM and a network interface device at the client machine while circumventing network protocol processing at the client machine. In step 730, integrity measurements are performed with respect to code and data stored at the online TPM. The integrity measurement process is defined by the TCPA Main Specification, Version 1.1b of which is incorporated herein by reference in its entirety (available at http://www.trustedcomputing.org/docs/main%20v1_1b.pdf). In general, the integrity measurement process includes the hashing of code segments prior to execution. Note that the integrity measurement process is not proxied out to the security module. On the contrary, integrity measurement is performed locally to the online TPM. The process of booting concludes at step 740.

IV. CONCLUSION

While various embodiments of the present invention have been described above it should be understood that they have been presented by way of example, and not limitation. It would be apparent to persons skilled in the relevant art that various changes in detail can be made therein without departing from the spirit and scope of the invention. Thus, the present invention should not be limited by any of the above described exemplary embodiments.

What is claimed is:

1. A system comprising:
   a trusted platform module (TPM);
   at least one application configured to send one or more requests to said TPM; and
   a hardware based security module coupled to said TPM, said security module configured to perform cryptographic processing and to provide long-term storage of cryptographic keys and cryptographic state information on behalf of said TPM,
   wherein said TPM is configured to access said security module over a secure communication connection using one or more layers of a network protocol stack when a cryptographic operation requiring at least one of said cryptographic keys or said cryptographic state information is required by said one or more requests, and
   wherein said TPM is configured to circumvent said one or more layers of said network protocol stack to access said security module during a secure boot process to retrieve said cryptographic state information.

2. The system of claim 1, wherein said secure communication connection employs a transport layer security (TLS) protocol.

3. The system of claim 1, further comprising an untrusted software stack that contains logic for intermediate processing between said at least one application and said TPM.

4. The system of claim 1, wherein said TPM and said security module are compliant with a version of the Trusted Computing Platform Architecture (TCPA) Main Specification.

5. The system of claim 1, wherein said security module is further configured to store all cryptographic state information on behalf of said TPM.

6. The system of claim 1, wherein said security module and said TPM are authenticated to each other.

7. The system of claim 1, wherein said TPM is in direct communication with a network interface device, such that the cryptographic state information is retrieved by said TPM from said security module via said network interface device while circumventing said one or more layers of said network protocol stack.

8. The system of claim 7, wherein said one or more layers of said network protocol stack is related to the transmission control protocol/internet protocol (TCP/IP).

9. The system of claim 7, wherein said TPM and said network interface device are embodied in an ethernet controller.

10. The system of claim 1, wherein said security module comprises logic implemented in software.

11. The system of claim 10, wherein said software is upgradeable independent of said TPM.

12. A method for providing a trusted security proxy, comprising:
   (a) receiving, at a security module, a cryptographic key associated with a remote trusted platform module (TPM);
   (b) providing long term storage for said cryptographic key and long term storage for cryptographic state information at said security module on behalf of said remote TPM;
   (c) receiving, at said security module, one or more requests to perform a cryptographic operation, requiring said cryptographic key, from at least one application via said remote TPM over a secure communication connection using one or more layers of a network protocol stack;

(d) performing said cryptographic operation on behalf of said remote TPM;

(e) providing a result of said cryptographic operation to said remote TPM over said secure communication connection; and (f) prior to performing step (c), providing the cryptographic state information from said security module to said remote TPM during a boot sequence while circumventing said one or more layers of said network protocol stack.

13. The method of claim 12, wherein step (c) comprises establishing said secure communication connection, between said TPM and said security module, using a transport layer security (TLS) protocol.

14. The method of step 12, wherein step (f) comprises:
   (i) executing a block of basic input output system (BIOS) code at said remote TPM; and
   (ii) performing integrity measurements at said remote TPM.

15. The system of claim 1, further comprising a network interface device located at a client machine, coupled to said TPM, and configured to transfer data between said TPM and said security module while circumventing said one or more layers of said network protocol stack.

16. The system of claim 1, wherein said TPM is located at a client machine and said security module is located at a server machine.

17. The system of claim 1, wherein said security module is configured to communicate with one or more additional TPMs.

18. A system for remote performance of network security functions, comprising:
   a trusted platform module (TPM);
   a network interface device configured to be in direct communication with said TPM;
   at least one application configured to send a request to said TPM; and
   a security module configured to be in communication with said TPM,
      wherein said TPM is configured to proxy said request to said security module via said network interface device using one or more layers of a network protocol stack,
      wherein said security module is configured to process said proxied request and to send cryptographic state information to said TPM via said network interface device, and
      wherein said TPM is configured to circumvent said one or more layers of said network protocol stack to access said security module during a secure boot process to retrieve said cryptographic state information.

19. The system of claim 18, wherein said TPM and network interface device are located at a client machine.

20. The system of claim 18, wherein said security module is located at a server machine.

21. A method for remote performance of network security functions, comprising:
   (a) receiving a request from an application, wherein said request is proxied by a trusted platform module (TPM) to a security module via a network interface device using one or more layers of a network protocol stack, said network interface device having a direct connection to said TPM;
   (b) processing said proxied request at said security module; and
   (c) sending a result of said proxied request to said TPM via said network interface device using said network protocol,
   wherein said TPM is configured to circumvent said one or more layers of said network protocol stack to access said security module during a secure boot process to retrieve cryptographic state information prior to performing step (a).

* * * * *